United States Patent
Randhava et al.

(10) Patent No.: US 6,984,372 B2
(45) Date of Patent: Jan. 10, 2006

(54) DYNAMIC SULFUR TOLERANT PROCESS AND SYSTEM WITH INLINE ACID GAS-SELECTIVE REMOVAL FOR GENERATING HYDROGEN FOR FUEL CELLS

(75) Inventors: Surjit Randhava, Evanston, IL (US); W. S. Winston Ho, Lexington, KY (US); Richard L. Kao, Northbrook, IL (US); Elias H. Camara, Clarendon Hills, IL (US)

(73) Assignees: Unitel Technologies, Inc., Mt. Prospect, IL (US); University of Kentucky Research Foundation, Lexington, KY (US)

( * ) Notice: Subject to any disclaimer, the term of this patent is extended or adjusted under 35 U.S.C. 154(b) by 286 days.

(21) Appl. No.: 10/236,324

(22) Filed: Sep. 6, 2002

(65) Prior Publication Data

US 2004/0047799 A1    Mar. 11, 2004

(51) Int. Cl.
C01B 3/26    (2006.01)

(52) U.S. Cl. .................. 423/652; 252/373; 422/190; 422/211; 422/239; 423/220; 423/222

(58) Field of Classification Search .............. 252/373; 422/190, 211, 239; 423/220, 222, 651, 652
See application file for complete search history.

(56) References Cited

U.S. PATENT DOCUMENTS 4,863,707 A * 9/1989 McShea et al. ............. 423/359

* cited by examiner

Primary Examiner—Stanley S. Silverman
Assistant Examiner—Maribel Medina
(74) Attorney, Agent, or Firm—Welsh & Katz, Ltd.; Thomas W. Tolpin

(57) ABSTRACT

This invention relates to a sulfur tolerant, dynamic, compact, lightweight fuel process and system that is capable of converting sulfur bearing carbonaceous fuels to hydrogen rich gases suitable for fuel cells or chemical processing applications. The process and system is based on the AHR and WGS reactions, followed by cleanup of byproduct sulfur-containing gases and carbon oxides that would otherwise poison the fuel cell electrocatalyst. Advantageously, this is accomplished via an ASMS and a methanator or an AWMR. The process and system preferably uses a special sulfur tolerant catalysts and hardware designs that enable the conversion in an energy efficient manner while maintaining desirable performance characteristics such as rapid start-stop and fast response to load change capabilities.

77 Claims, 8 Drawing Sheets

DYNAMIC SULFUR TOLERANT FUEL PROCESS AND SYSTEM – CONFIGURATION 3

ACID GAS – SELECTIVE MEMBRANE SEPARATOR

THERMAL GRAVIMETRIC ANALYSIS FOR POLYMER BLENDS AND COPOLYMERS

DYNAMIC SULFUR TOLERANT PROCESS AND SYSTEM WITH INLINE ACID GAS-SELECTIVE REMOVAL FOR GENERATING HYDROGEN FOR FUEL CELLS

FIELD OF THE INVENTION

This invention relates to a sulfur tolerant, dynamic, compact and lightweight fuel process and system and process that is capable of converting sulfur bearing carbonaceous fuels to hydrogen rich gases suitable for fuel cells or chemical processing applications. The process is based on the autothermal hydrodesulfurizing reforming and water gas shift reactions, followed by clean up of byproduct sulfur-containing gases and carbon oxides that poison the fuel cell electrocatalyst via an acid gas-selective membrane separator and methanator or an acid gas-selective water gas shift membrane reactor. Special catalysts and hardware designs are preferably used to enable the fuel process and system to have high energy efficiency while maintaining desirable performance characteristics.

BACKGROUND OF THE INVENTION

A fuel cell is an electrochemical device that produces electricity from hydrogen or hydrogen rich gases without combustion, with water and heat as the only by-products. Fuel cell systems have several advantages over conventional power generation systems, including lower emissions, higher fuel efficiency, quieter operation, lower vibration, more reliable, lower maintenance and potentially lower capital costs. For instance, many phosphoric acid (PA) fuel cells installed at hospitals, banks, military bases, offices, factories and computing facilities have now accumulated many years of operation with only scheduled maintenance. These advantages enable fuel cells to offer cleaner and more efficient alternatives to existing power sources. Fuel cells are being developed for portable, residential, commercial, industrial, transportation and other power generations. They are vastly different from other power generation systems.

Individual fuel cells typically are stacked with bipolar separator plates separating the anode electrode of one fuel cell from the cathode electrode of an adjacent fuel cell to produce fuel cell stacks. These fuel cell stacks make the fuel cells operate at high efficiency, regardless of size and load. Distributed power generation from fuel cells reduces the capital investment and further improves the overall conversion efficiency of fuel to end use electricity by reducing transmission losses. Substantial advancements have been made during the past several years in fuel cells. Increased interest in the commercialization of polymer electrolyte membrane (PEM) fuel cells, in particular, has resulted from recent advances in fuel cell technology, such as more economical bipolar separator plates, higher current densities and the 100-fold reduction in the platinum content of the electrodes.

The electrolyte in PEM fuel cells is a solid ion conduction polymer, in which protons are mobile. That is why the PEM fuel cells are also called "proton exchange membrane fuel cells". Ideally, PEM fuel cells operate with hydrogen. In the absence of a viable hydrogen storage option or a near-term hydrogen-refueling infrastructure, it is necessary to convert available fuels, typically $C_nH_m$ and $C_nH_mO_p$, collectively referred to herein as carbonaceous fuels, with a fuel process and system into hydrogen rich gases suitable for use in fuel cells. The choice of fuel for fuel cell systems will be determined by the nature of the application and the fuel available at the point of use. In transportation applications, it may be gasoline, diesel, methanol or ethanol. In stationary systems, it is likely to be natural gas or liquefied petroleum gas. In certain niche markets, the fuel could be ethanol, propane, butane or even biomass-derived materials. In all cases, reforming of the fuel is necessary to produce a hydrogen rich gas. However, the reforming catalyst (often Ni based) are poisoned by sulfur impurities in the carbonaceous fuels at temperatures less than 800° C. and therefore a hydrodesulfurization step or sulfur adsorption bed must be added to the fuel process and system prior to the reforming step. This is due to the adsorption of sulfur on the active metal catalyst sites. Sulfur also tends to increase coking rates which leads to further degradation of the reforming catalysts and unacceptable catalyst performance.

Regardless of the type-of reformer, the initial reforming product invariably contains CO. The bulk of the CO can be converted to additional hydrogen via the water gas shift (WGS) reaction. Hydrogen formation is enhanced by low temperatures, but is unaffected by pressure. Shift reactors can lower the CO level to about 0.5 to 2 mol %.

In this invention, an autothermal hydrodesulfurizing reforming catalyst (AHR catalyst) preferably as described in U.S. patent application Ser. No. 09/860,850 filed May 18, 2001 entitled "Autothermal Hydrodesulfurizing Reforming Catalyst", is used for the autothermal hydrodesulfurizing reforming of sulfur bearing carbonaceous fuels into hydrogen rich gases, and a WGS catalyst, preferably a precious metal, sulfur tolerant, non-pyrophoric Pt/doped ceria/$\gamma$-alumina catalyst is used for WGS. Both catalysts' performances are not poisoned or degraded by sulfur impurities in the fuels. Sulfur impurities react in the autothermal hydrodesulfurizing reformer (AHR) and are converted to hydrogen sulfide, hydrogen and carbon oxides.

$H_2S$ and CO act as severe fuel cell electrocatalyst poison, while $CO_2$ in the hydrogen rich gas acts as a diluent which increases the mass transfer resistance to decrease the fuel cell efficiency. In addition, $CO_2$ produces CO via the reverse WGS reaction at the fuel cell anode. Therefore, an acid gas ($CO_2$ and $H_2S$)-selective removal and a CO clean-up system is usually required right ahead of the PEM fuel cells. Furthermore, a total elimination of $CO_2$ is necessary for alkaline fuel cells because $CO_2$ in the reformate reacts with the alkaline electrolyte and greatly hinders the performance of alkaline fuel cells.

As for the PA fuel cells, the phosphoric acid is tolerant to $CO_2$ in the fuel and oxidant, unlike the alkaline fuel cells. Also, since the PA fuel cells operate at higher temperatures (about 180 to 230° C.) than PEM fuel cells and alkaline fuel cells, CO levels of 1 to 1.5% are acceptable and the final clean up step for CO via the methanator or the acid gas-selective WGS membrane reactor (AWMR) is no longer required. However, eliminating $CO_2$ from a reformate increases into $H_2$ concentration, greatly benefiting PA fuel cell power density, thus reducing cost.

It is, therefore, desirable to provide an improved sulfur tolerant dynamic fuel process and system with inline acid gas-selective removal for converting sulfur bearing carbonaceous fuels into hydrogen rich gases suitable for fuel cells and chemical processing applications.

BRIEF SUMMARY OF THE INVENTION

The present invention seeks to provide an economical, efficient and compactly configured sulfur tolerant dynamic fuel process and system and process with inline acid gas-selective removal for converting sulfur bearing carbonaceous fuels into hydrogen rich gases suitable for fuel cells or chemical processing applications. As shown in FIG. 1, the evaporator/preheater, the AHR, and WGS reactor are wrapped around each other in a concentric vessel design for simplified thermal management.

It is another object of this invention to use our an AHR catalyst for low temperature (about 500 to 800° C.) reforming of sulfur bearing carbonaceous fuels without any prior desulfurization. The catalyst's performance is not poisoned or degraded by sulfur impurities in the fuels.

It is yet a further object of this invention to adopt our improved sulfur tolerant non-pyrophoric WGS catalyst, which enables the use of a single-stage WGS reactor, wherein the catalyst is much more thermally rugged than copper-zinc oxide catalyst. The catalyst is active at about 200 to 400° C., and appears to be very attractive for fuel cell applications because it can tolerate both oxidizing and reducing environments, as well as temperature excursions.

It is yet still a further object of this invention to use a novel acid gas-selective membrane separator (ASMS) for the acid gas-selective removal so that the resulting hydrogen rich gases are suitable for PA fuel cells (FIG. 2).

It is yet still a further object of this invention to use an ASMS for the acid gas-selective removal and a methanator for the final CO and $CO_2$ contaminant reduction to appropriate levels for PEM and alkaline fuel cells (FIG. 1).

It is yet still a further object of this invention to use an AWMR for both the acid gas-selective removal and the final CO contaminant reduction to less than 10 ppm levels required by the PEM fuel cells (FIG. 3).

It is yet still a further object of this invention to enable the sulfur tolerant, dynamic, compact fuel process and system having desirable performance characteristics such as rapid start-stop and fast response to load change capabilities.

It is yet still a further object of this invention to eliminate the zinc oxide bed in the fuel process and system which makes the fuel process and system to be maintenance free.

These and other objects of this invention are addressed by a system having been configured so that the fuel-water-oxidant mixture first enters through a vaporizer/preheater and then flows into an AHR section. The reformed gas then flows through a WGS bed where appropriate water gas shifting is conducted to lower the CO level and enhance the hydrogen formation. Finally, the gas flows through an ASMS for acid gas-selective removal and a methanator or an AMWR to bring the CO and $CO_2$ effluent levels down to appropriate levels.

In this invention, we use an ASMS which not only enhances the $H_2$ content of a reformate by acid gas-selective removal but also enables the methanation reaction equilibrium to eliminate the CO and $CO_2$ in the reformate (FIG. 1).

As shown in FIG. 4, the acid gas is selectively removed from a reformate stream by contacting the feed stream against the high-pressure side (feed gas pressure) of the membrane, i.e., the retentate side, and by withdrawing a permeate comprising the acid gas at the low-pressure permeate side of the membrane, i.e., the permeate side. Spent cathode gas sweep, air sweep or vacuum can be used to remove the permeate comprising the acid gas at the low-pressure permeate side of the membrane. Thus, a high-pressure (same as the feed pressure), higher purity hydrogen rich gas is recovered and the need for an unwanted compressor is eliminated.

A more detailed explanation of the invention is provided in the following description and appended claims taken in conjunction with the accompanying drawings.

DETAILED DESCRIPTION OF THE INVENTION

Figure 1:
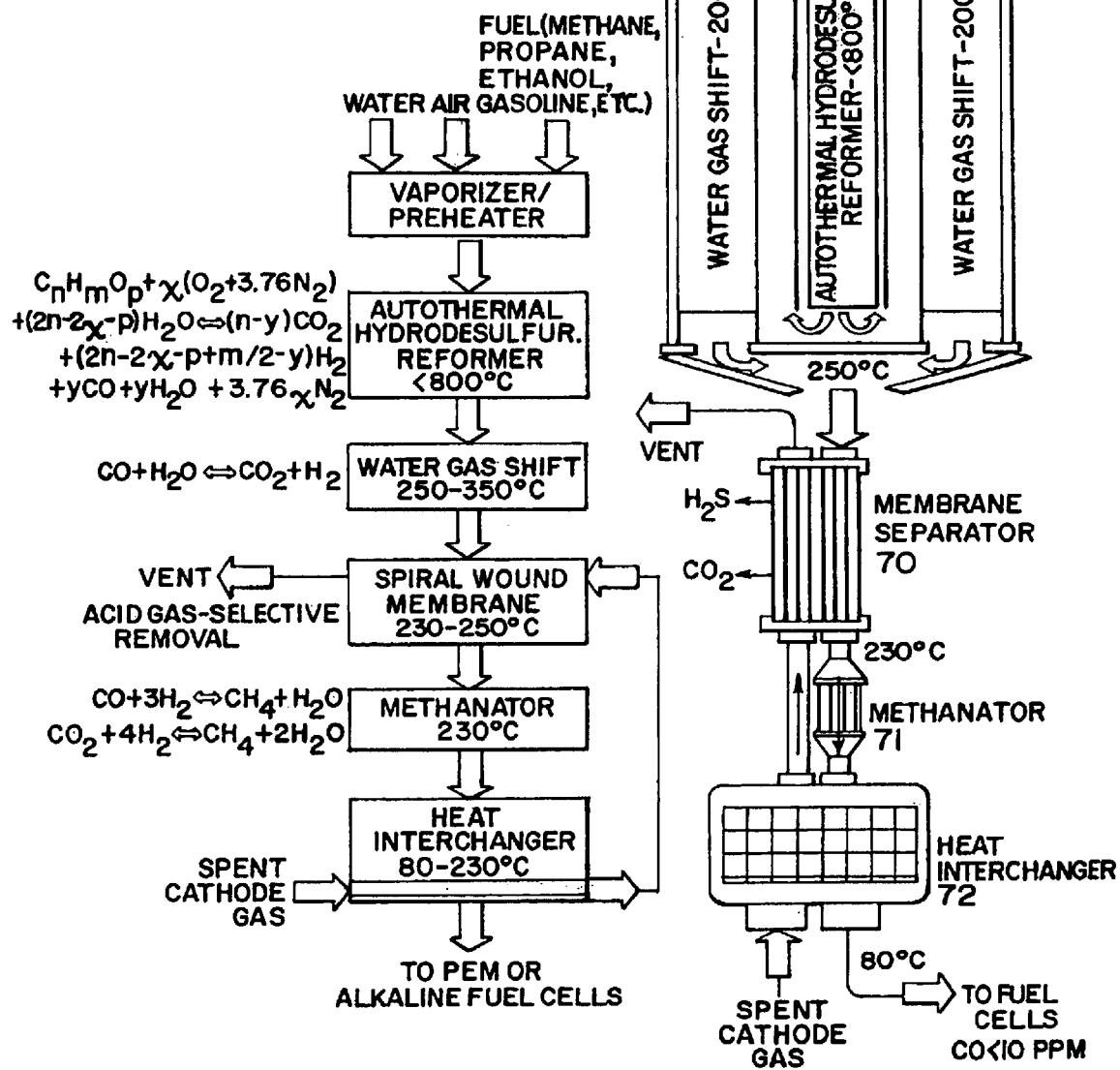
FIG. 1 is a flow diagram of a dynamic sulfur tolerant fuel process and system—Configuration 1.

A detailed description of the preferred embodiments and best modes for practicing the invention are discussed thereinafter along with some examples thereof.

Sulfur impurities in carbonaceous fuels such as gasoline, diesel, or natural gas, cause major problems for reforming these fuels to hydrogen rich gases for use in fuel cell power generating systems or chemical processing applications. The sulfur impurities poison the reforming catalysts, as well as other catalysts in the processing stream and catalysts in the fuel cells. The poisoning is generally due to strong chemisorption of sulfur to the active metal catalyst sites. In addition, sulfur impurities increase the coking seen in the reforming catalysts, accelerating a second mechanism for degradation of the catalysts. In order to get a clean hydrogen rich gas, it is preferred to first desulfurize the sulfur bearing carbonaceous fuels. This is generally done with hydrodesulfurization, which consumes some of the hydrogen produced. Adsorption processes are other alternatives but are generally less effective than hydrodesulfurization due to the complex nature of the sulfur impurities in diesel, gasoline, or natural gas. The sulfur is in the form of thiols, thiophenes, and benzothiophenes. The organic functions make it difficult to adsorb the sulfur containing species preferentially.

In accordance with the process of the present invention, the sulfur bearing carbonaceous fuels are reformed over our improved sulfur tolerant and coking resistant AHR catalyst prior to the sulfur removal. The sulfur impurities can be cracked or reformed to $H_2S$, $H_2$ and carbon oxides in the AHR. The bulk of CO in the reformate gas can be converted to additional hydrogen and $CO_2$ via the WGS reaction over our improved sulfur tolerant and non-pyrophoric WGS catalyst:

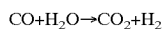

The $H_2S$ and $CO_2$ can then be removed via an ASMS after the WGS reactor at lower temperatures. This will increase the overall energy efficiency of the fuel process and system by eliminating the hydrodesulfurization or the sulfur adsorption step prior to the reformer and WGS reactor.

Industrially, the WGS reaction is usually conducted over two catalysts, which operate in different temperature regimes. One catalyst is a FeCr mixed oxide, which operates at 350–450° C. and is termed the high-temperature shift (HTS) catalyst. The second catalyst is a Cu/ZnO, which operates at 200–280° C. and is termed the low-temperature shift (LTS) catalyst. Although these two catalysts are used industrially in the production of hydrogen for ammonia synthesis, they have major drawbacks. Both the LTS and the HTS catalysts must first be "activated" before being used. For example, the copper in the Cu/ZnO LTS catalyst must first be reduced to elemental copper in situ before it becomes active for the WGS reaction. This reduction reaction is exothermic and must be carried out under well-controlled conditions using a dilute hydrogen stream (1 vol % $H_2$) to prevent high catalyst temperatures, which can result in sintering (agglomeration) of the copper particles and loss of active surface area for the WGS reaction. Also, once the catalyst has been activated by reduction, it must be protected from exposure to ambient air to prevent re-oxidation of the copper. The activated catalyst must also be protected from the condensation of liquids, for example, during start-up or transient operation. Besides, this commercial copper based LTS catalyst, Cu/ZnO is complete intolerant to sulfur bearing feedstock. For these reasons, a more thermally rugged and sulfur tolerant catalyst which has sufficient activity to operate at the low temperatures that are thermodynamically necessary to achieve low CO concentrations is needed.

We have investigated sulfur tolerant and non-pyrophoric platinum/doped ceria/γ-alumina catalyst, which has WGS activity comparable to commercial Cu/ZnO catalysts. However, unlike the commercial FeCr and Cu/ZnO catalysts, this catalyst does not have to be activated by in situ reduction, does not lose its activity upon exposure to air at 21–550° C., and is active over a wide temperature range (180–400° C.) so that it can be used effectively as both the HTS and the LTS catalysts. Therefore, in our preferred process, we use a single stage WGS reactor loaded with this catalyst working at low to medium temperatures which eliminates the need for one additional WGS reactor and the interstage heat exchanger as currently practiced. This catalyst can reduce the exit CO concentration to about 1 mol % (dry basis) from a simulated inlet reformate gas consisting of 4.39 ppm $H_2S$, 6.42 mol % CO, 7.78 mol % $CO_2$, 27.53 mol % $H_2$, 40.19 mol % $N_2$, and 16.88 mol % $H_2O$ (wet basis). In addition, the estimates based on isothermal kinetic data show that this catalyst has the potential to reduce WGS catalyst volume to 68% of that of the commercial Fe/Cr—Cu/ZnO combination.

However, the WGS reaction is an equilibrium controlled chemical reaction, regardless of the type of WGS catalyst used, there is always some CO left in the WGS product gas, about 0.5 to 2 mol % CO, still too high to feed the PEM fuel cells. The presence of CO in the hydrogen product gas can poison the fuel cell anode catalyst. For instance, 30 ppm of CO can cause a 48% drop in the output cell voltage of a PEM fuel cell from 0.6 volt to 0.31 volt at 150 amperes/ft$^2$, and 100 ppm of CO can have output cell voltage drops up to 90% at a current density of 650 amperes/ft$^2$. Currently, the final CO contaminant reduction to appropriate levels required by the PEM fuel cells is based on catalytic preferential oxidation (PROX) of CO in an adiabatic reactor. Typically, a four stage reactor with interstage heat exchangers, air injections and mixing is required for reducing 2 mol % CO inlet to less than 10 ppm at the outlet. However, the reduction of CO levels to less than 10 ppm requires the use of control algorithms, particularly with respect to temperature control, including cascade control of the air being bled into the reactor, which consumes hydrogen and reduces its concentration in the hydrogen product gas. As a result, about 15% reduction in energy efficiency is caused by the use of a PROX unit. Meanwhile, $CO_2$ in the hydrogen product gas acts as a diluent, which increases the mass transfer resistance to decrease the fuel cell efficiency for another 5%. In addition, $CO_2$ produces CO via the reverse WGS reaction at the fuel cell anode. Therefore, using this invention to generate the hydrogen product gas without carbon oxides can increase the fuel cell efficiency by about 20%.

Figure 2:
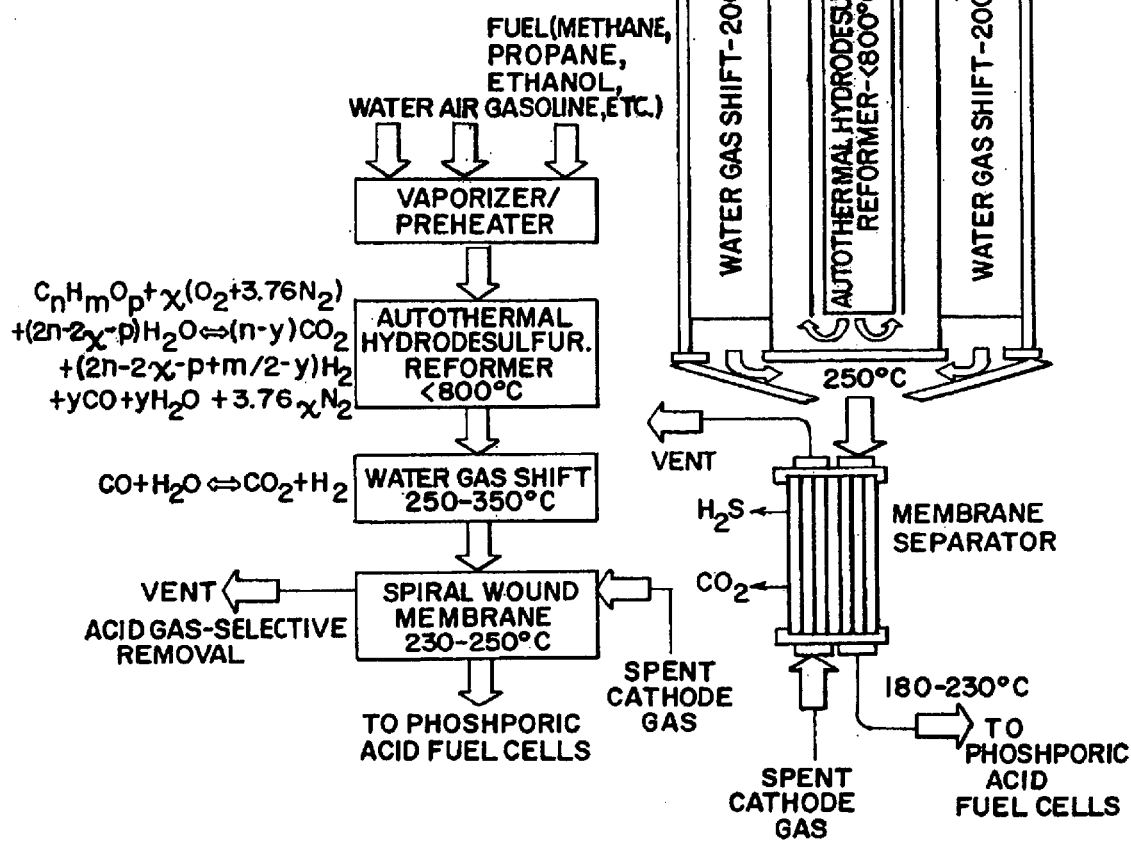
FIG. 2 is a flow diagram of a further dynamic sulfur tolerant fuel process and system—Configuration 2.
Figure 3:
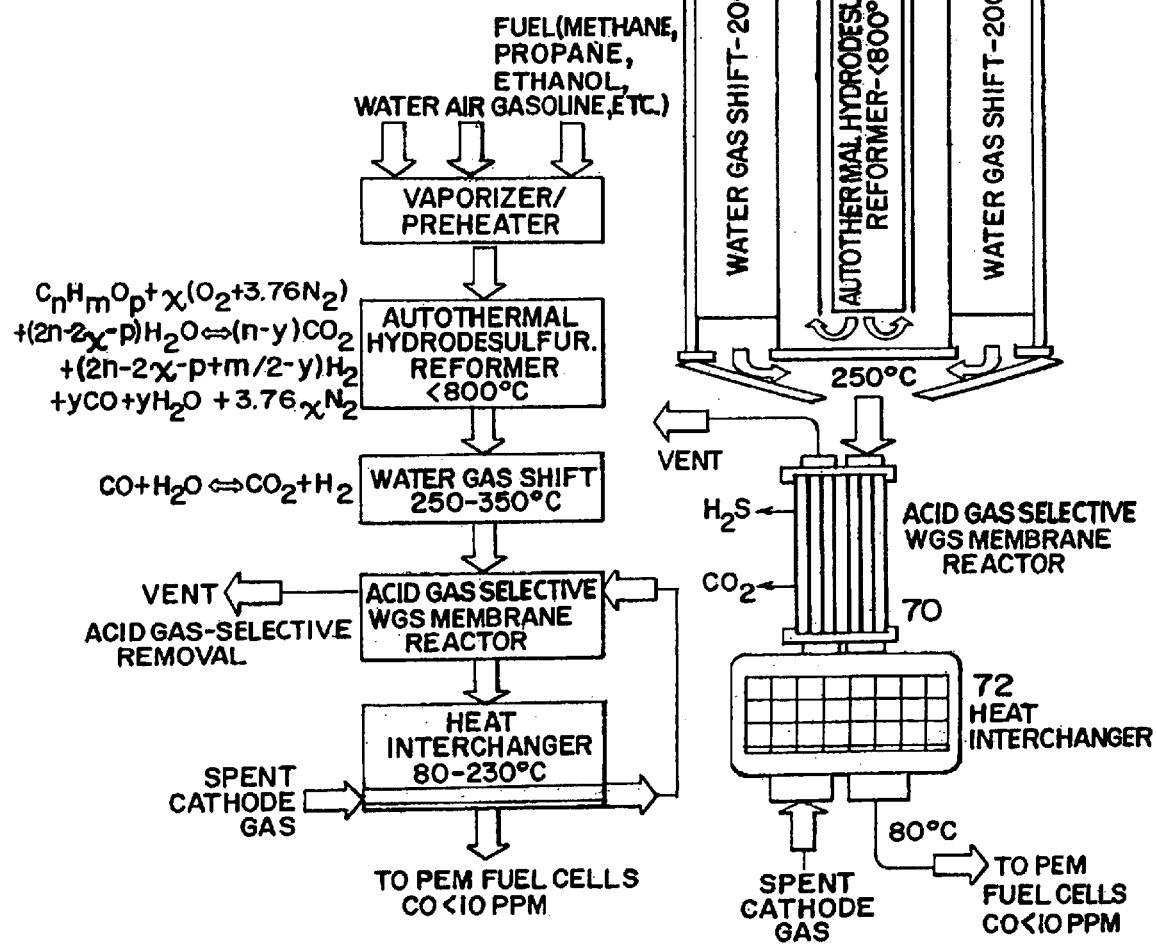
FIG. 3 is a flow diagram of another dynamic sulfur tolerant fuel process and system—Configuration 3.
Figure 4:
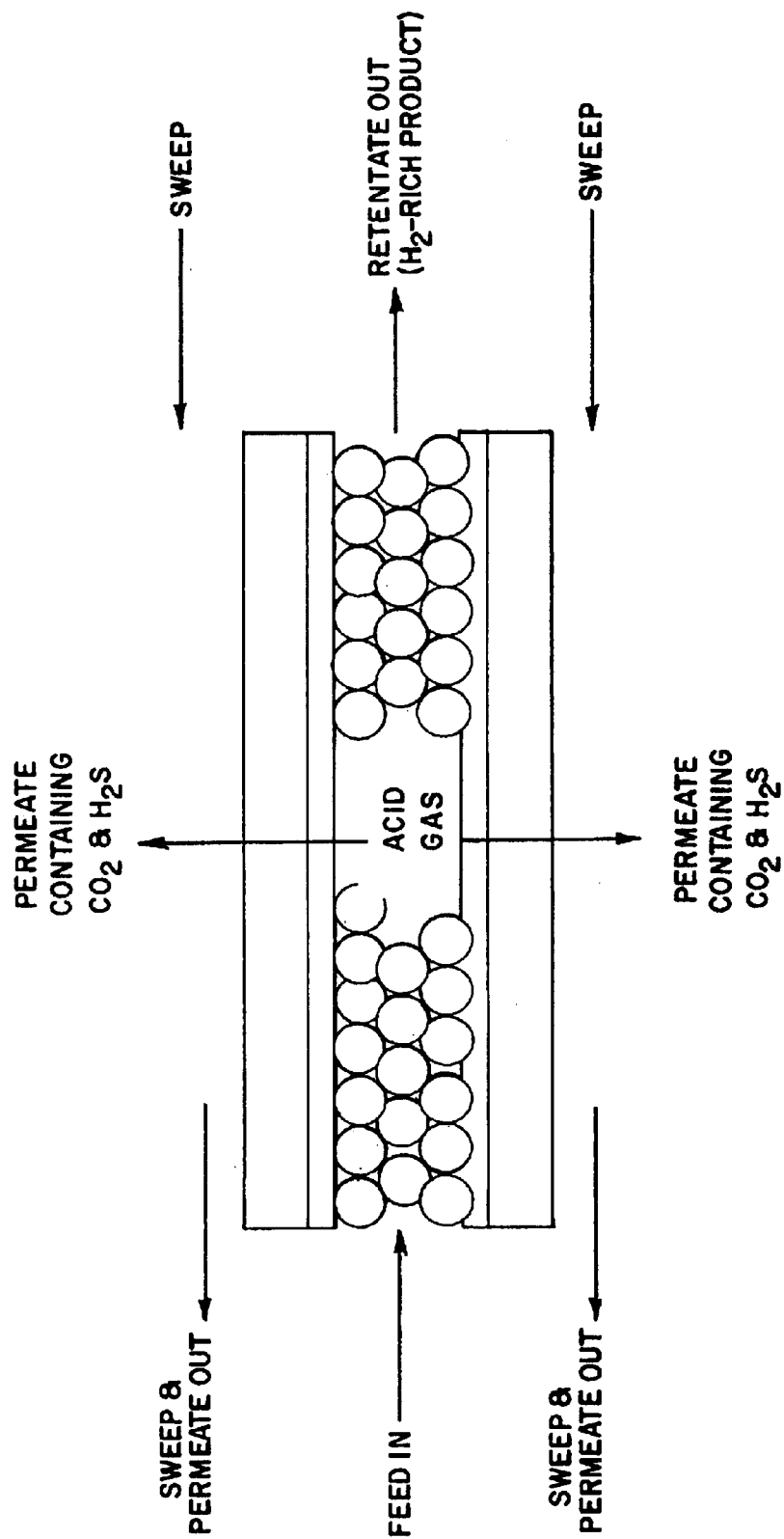
FIG. 4 is a cross-sectional diagrammatic view of an acid gas-selective membrane separator.

In a preferred process of this invention, the acid gas-selective removal of the WGS product gas to appropriate levels for PA fuel cells is optimally approached using an ASMS (FIG. 2) which not only enhances the hydrogen content of the WGS product gas by acid gas-selective removal but also enables the methanation reaction equilibrium to eliminate both CO and $CO_2$ in the WGS product gas. Thus, the hydrogen rich gas produced from the methanation is essentially free of CO and $CO_2$ so that it is suitable for both PEM and alkaline fuel cell applications (FIG. 1). The acid gas-selective nature of the membrane defined as "facilitated transport mechanism" in which the acid gas, $CO_2$ and $H_2S$, on the high pressure feed side reacts with the membrane at the interface between the feed gas and the membrane, and the reaction products permeate through the membrane to the interface between the membrane and the low pressure permeate side where the acid gas is desorbed into the low pressure side. Spent cathode gas sweep, air sweep or vacuum can be used to remove the acid gas on the low pressure permeate side of the membrane to maintain a high driving force for the separation.

Figure 5:
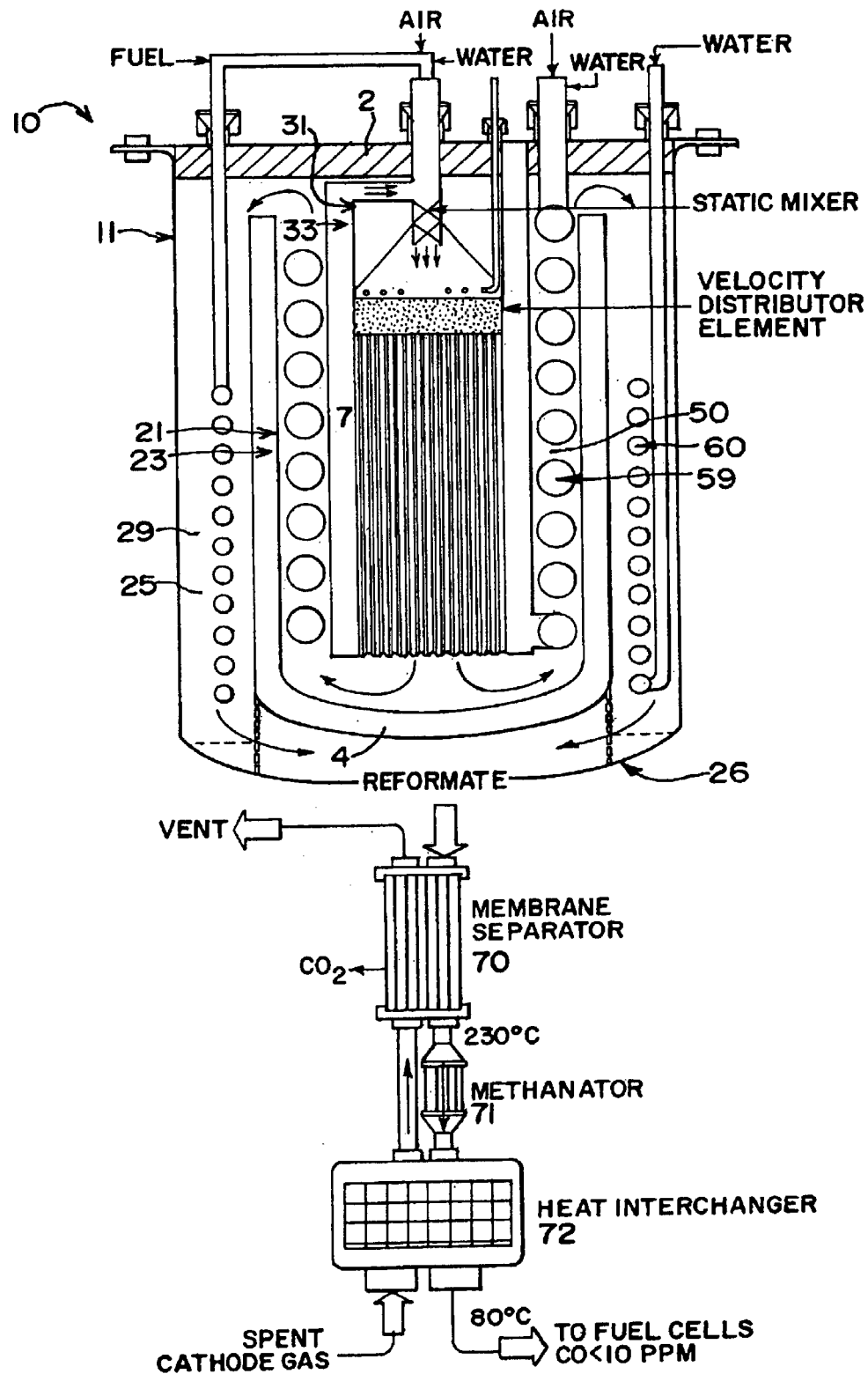
FIG. 5 is a flow diagram of a dynamic sulfur tolerant fuel process and system with an acid gas-selective separator and methanator.

One embodiment of this invention is shown in FIG. 5. Dynamic sulfur tolerant fuel process and system 10 consists of three concentric cylinders 11, 21, 31, ASMS 70, methanator 71 and heat interchanger 72, designed to optimize temperature control and thermal integration of the AHR reaction zone with the subsequent WGS reaction zone 25 and the clean up zones 70, 71 and 72. The fuel process and system 10 has insulating slabs 2 and 4 at its axial ends. Inside the fuel process and system 10, layers of insulation 23 and 33 separate the three concentric cylinders.

The well-mixed feed mixture from the bottom of the velocity distributor element 6 is brought into contact with catalyst resulting in formation of hydrogen rich gas (reformate gas) containing largely $H_2$, $CO_2$, CO, $H_2O$ vapor, and $N_2$ at a temperature of about 500 to 800° C. The catalyst is suitable for both partial oxidation and steam reforming reactions, and also is sulfur tolerant to allow downstream inline acid gas-selective removal at much lower temperature (about 180 to 250° C.), and thus increases the overall energy efficiency of the fuel process and system. The catalyst has also been found to be exceptionally resistant to coking.

The hot AHR reformate gas exits at the bottom of AHR and turns upward to flow through the annulus 50 between the cylinders 21 and 31 defined as the vaporizer/preheater where the hot reformate gas is cooled by transferring its sensible heat to preheat as well as generating super-heated steam in tube 59.

The reformate gas then flows downward into the annulus between the cylinders 11 and 21, where the sulfur tolerant and non-pyrophoric WGS catalyst 29 in the WGS reaction zone 25 is housed. The entire length of WGS reaction zone is embedded with a heat-transfer helical boiler coil 60 in which the water fed to the WGS reactor is vaporized and superheated. This superheated steam is mixed with fuel, air and water, and the mixture is then combined and well-mixed with the preheated air/steam before supplying to AHR. The WGS boiler coil 60 can cool the reformate gas to about 200 to 250° C. The cooled reformate gas exits at the bottom of the vessel 26.

Figure 6:
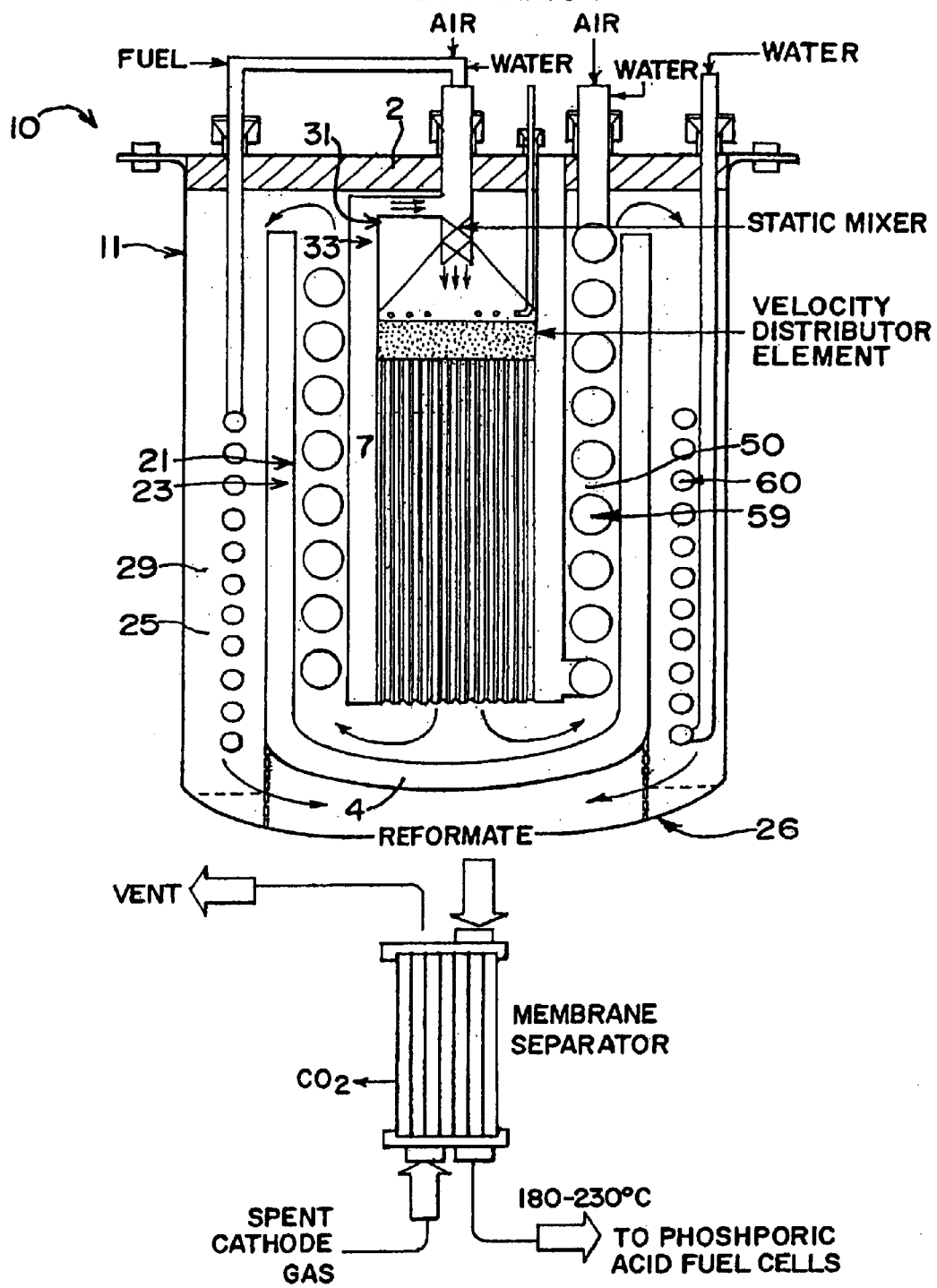
FIG. 6 is a flow diagram of a dynamic sulfur tolerant fuel process and system with an acid gas-selective separator.

The reformate gas exits the bottom of the vessel 26 at about 200 to 250° C. containing 40 to 50 mol % $H_2$, 12 to 18 mol % $CO_2$, 0.5 to 2 mol % CO, and the balance for $N_2$ on a dry basis, and enters the ASMS 70 where hot spent cathode gas sweep, air sweep or vacuum can be used to remove the permeate containing $CO_2$ and $H_2S$, and a sulfur free enhanced hydrogen rich gas (retentate) is recovered at the feed gas pressure which is suitable for feeding PA fuel cells (FIG. 6).

The dynamic characteristics of this fuel process and system 10 such as rapid start-stop and fast response to load change capabilities had been illustrated in a separate U.S. patent application Ser. No. 10/112,684 filed Mar. 29, 2002 for a Dynamic Fuel Processor With Controlled Declining Temperature.

The final elimination of CO and $CO_2$ in the ASMS product gas is accomplished in the methanator 71 (FIG. 5). The methanation reactions:

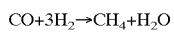

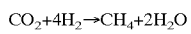

are highly exothermic which help to heat the sweep gas in the heat interchanger 72. The clean and cooled hydrogen rich gas is then fed to PEM or alkaline fuel cells for generating electricity and heat.

Figure 7:
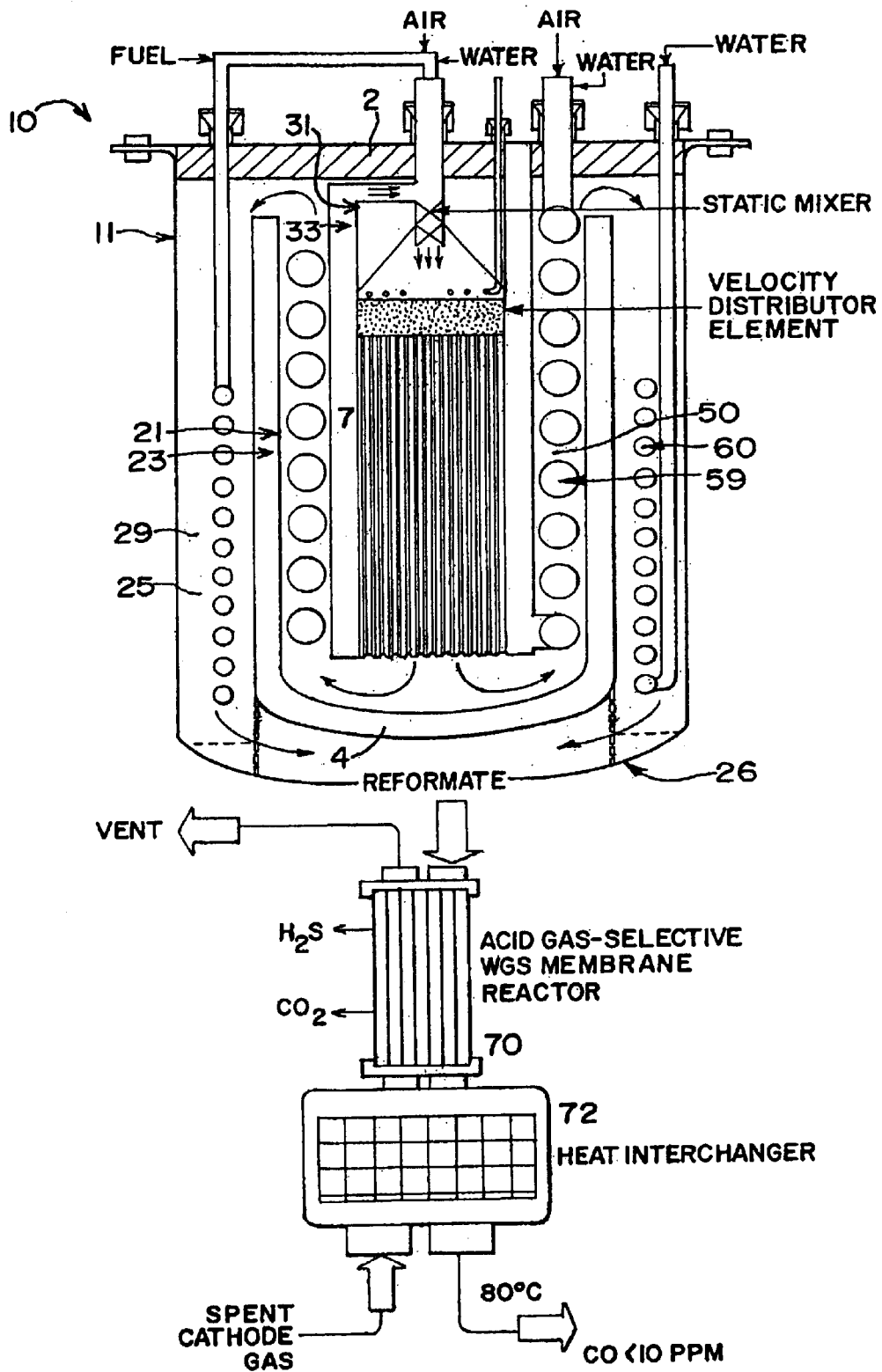
FIG. 7 is a flow diagram of a dynamic sulfur tolerant fuel process and system with an AWMR.

Another embodiment of this invention is shown in FIG. 7 where an AWMR is used to replace the ASMS and the methanator. The AWMR can separate the acid gas in the reformate first to promote the WGS reaction which follows to convert CO and steam to additional hydrogen and $CO_2$. This additional $CO_2$ produced is again removed through the membrane simultaneously during its production and thus the reverse WGS reaction is prevented. Therefore, in the AWMR, the conversion of CO is close to completion. It not only decreases the CO content in the reformate to 10 ppm or less levels required by PEM fuel cells, but also reduces the size, volume and weight of the commercial WGS reactor by a factor of 30 or greater. A smaller AWMR and less thermal mass are essential for the fuel process and system to have desirable performance characteristics such as faster response to load changes, higher energy efficiency, and most of all, to bring the fuel process and system cost down.

ASMS/AWMR is a microchannel separator/reactor with a compact configuration such as the spiral-wound membrane with a high membrane surface per unit volume that can decrease heat and mass transport limitations for the acid gas-selective removal and WGS reaction. The key component of the ASMS/AWM is the acid gas-selective membranes such as membranes comprising polyamines (poly 2 or 4-vinylpyridine) and polyimide (derived from polyamic acid which is synthesized from oxydianiline and oxydiphthalic anhydride) blends and copolymers. The hard segment of the copolymers, polyimide, provides the thermal stability of the membrane whereas the soft segment of the copolymers, polyamine, reacts with $H_2S$ and $CO_2$ but not with $H_2$ and CO. The reaction products permeate through the membrane to the low pressure permeate side where the $H_2S$ and $CO_2$ are desorbed. $H_2$ and CO are rejected by the membrane and retained on the high pressure side of the membrane which not only eliminates the need for an unwanted compressor, but also produces an ideal fuel for the fuel cells, i.e. a hydrogen rich gas with appropriate levels of carbon oxides and sulfur-containing gases.

In one form, a dynamic fuel processing process can be provided for converting sulfur bearing carbonaceous fuels into hydrogen rich gases for fueling many types of fuel cells or chemical processing applications. The dynamic fuel processing process can comprise a vaporizer and preheater for vaporizing liquid fuels and water and for preheating feeds by transferring sensible heat from the reformate gas. The dynamic fuel processing process can include a feed mixer to provide reactant mixing. The feed mixer can comprise a static mixer, opposite jets, opposed annular jets, etc. An AHR can be provided to combine the heat affects of partial oxidation, steam reforming reactions, preheated and heat losses by feeding fuel, water and an oxidant, such as air or an oxygen-containing gas, over a sulfur tolerant three part catalyst to yield a hydrogen rich reformate gas. A zinc oxide sulfur trap can also be provided to remove sulfur impurities at low temperatures, such as from 250 to 400° C. A WGS reactor can be provided to convert CO and steam in a reformate gas to additional hydrogen and $CO_2$ by a WGS reaction. A steam generator can further be provided to vaporize and superheat water feed to a WGS boiler coil. A PROX reactor can also be provided to reduce CO levels in the reformate gas to appropriate levels suitable for feeding fuel cells or chemical processing applications.

In another form, a fuel process and system can be provided to convert sulfur bearing carbonaceous fuels into hydrogen rich gases for use with fuel cells or chemical processing applications. The fuel process and system can comprise a set of three cylinders positioned substantially concentrically to each other to define an AHR reaction zone, a sulfur reaction removal zone, and WGS reaction zone. These cylinders can comprise an inner cylinder providing an AHR, an outer cylinder positioned outwardly of the inner cylinder, and an intermediate cylinder positioned between the inner cylinder and the outer cylinder. The AHR can comprise a dome which can define a diffuser zone. The AHR can also comprise a fuel tube in communication with the diffuser zone. A fuel injector can be provided to feed sulfur bearing carbonaceous fuel into the fuel tube. One or more oxygen-containing gas injectors can also be provided to feed air or another oxygen-containing gas into the fuel tube along with the fuel. One or more water injectors can be provided to feed and mix steam and/or water with the fuel and oxygen-containing gas in the fuel tube. Desirably, an AHR catalyst is positioned below the dome. In the preferred form, the AHR catalyst comprises a dehydrogenation portion, an oxidation portion, and a hydrodesulfurizing portion.

The hydrogenation portion of the AHR catalyst can comprise a metal and metal alloy from a Group VIII transition metals and/or mixtures thereof. The oxidation portion of the AHR catalyst can comprise a ceramic oxide powder and dopant, such as rare earth metal, alkaline earth metals, alkali metals and/or mixtures thereof. The hydrodesulfurization portion of AHR catalyst can comprise one or more of the following: Group IV rare earth metal sulfides, Group IV rare earth metal sulfates, as well as their substoichiometric metals. The ceramic oxide powder can comprise a material such as $ZrO_2$, $CeO_2$, $Bi_2O_3$, $BiVO_4$, $LaGdO_3$ and/or mixtures thereof.

In a further form, the fuel process and system can comprise a set of vessels having substantially upright concentric annular walls. The vessels can comprise an inner vessel, an outer vessel, and an intermediate vessel which is positioned between the inner vessel and the outer vessel. The outer vessel can comprise an AHR with an AHR reaction zone containing a bed of AHR catalyst as indicated above. The inner vessel can comprise a dome providing a diffuser zone which is positioned above the AHR reaction zone. The AHR can also comprise a fuel tube in communication with the diffuser zone. The AHR can further have injectors for feeding a feed mixture of sulfur bearing carbonaceous fuel, an oxidant such as air or an oxygen-containing gas, and water (liquid and/or steam), through the fuel tube into the diffuser zone. Desirably, the AHR catalyst reforms the feed mixture to form a hydrogen rich reformate gas in the AHR reaction zone.

An annulus comprising an intermediate annular vaporizer and preheater zone can be positioned between the inner vessel and outer vessel so as to communicate with the AHR reaction zone to receive and cool the hot reformate gas from the AHR reaction zone. The intermediate annular vaporizer and preheater zone can contain a preheat coil to receive sensible heat form the reformate gas to heat at least some of the oxidant and/or water.

An annular sulfur removal zone can be positioned between the intermediate vessel and the outer vessel so as to communicate with the intermediate annular vaporizer and preheater zone to receive the reformate gas from the intermediate annular vaporizer and preheater zone. Advantageously, the annular sulfur removal zone contains a bed of sulfur-removing catalyst to remove hydrogen sulfide from the reformate gas.

A WGS reactor can comprise an outer annular WGS reaction zone which can be positioned below and communicates with the annular sulfur removing zone at a location between the intermediate vessel and the outer vessel. The WGS reactor can contain a bed of WGS catalyst to convert CO and steam in the reformate gas to additional hydrogen and $CO_2$ after the $H_2S$ has been removed from the reformate gas in the sulfur removal zone. The WGS reactor can have a boiler coil to vaporize and superheat the water fed to the WGS reactor. The fuel processor can also have an outlet positioned below the inner vessel and the intermediate vessel so as to communicate with the WGS reaction zone to discharge reformate gas after the WGS reaction zone.

In this invention we have investigated and synthesized several high temperature polymer blends and copolymers that are suitable for use in ASMS/AWMR to enhance the acid gas-selective separation/WGS reaction as described in the following:

To a solution containing 3 grams of Oxydianiline in 12.4 ml of dimethylformade, 4.75 grams of Oxydiphthalic Anhydride was added gradually under mixing to made the polyamic acid. During the synthesis of the polyamic acid, additional 26.3 ml of DMF was added to the solution to keep up with the increase of solution viscosity. To the resulting polyamic acid was a solution of 7.75 grams poly(4-vinylpyridine), abbreviated as P4VP, in 25.4 ml DMF. Additional 20 ml of DMF was added to the solution. The resulting solution was used to cast a membrane by the use of a casting knife. The cast membrane was kept in a fume hood at ambient temperature overnight to allow the evaporation of the DMF solvent. Then, the membrane was dried at 120° C. under nitrogen overnight. Finally, the membrane was cured at 220° under nitrogen for 4.5 hours. This membrane was designated as membrane comprising 50 wt % Poly(4-vinylpyridine) and 50 wt % Polyimide derived from Oxydianiline and Oxydiphthalic Anhydride (5OP4VP).

The other membrane designated as Membrane comprising 35 wt % Poly(4-vinylpyridine) and 65 wt % Polyimide derived from Oxydianiline and Oxydiphthalic Anhydride (35P4VP) was synthesized by the same procedures as above except a solution of 4.17 grams of P4VP in 13.7 ml DMF and a curing at 240° C. for 2.5 hours were used.

Another membrane designated as Membrane comprising 77 wt % Poly(4-vinylpyridine) and 23 wt % Polyimide derived from Oxydianiline and Oxydiphthalic Anhydride (77P4VP) was synthesized by the same procedures as above except the appropriate amount of P4VP was used.

Still another membrane designated as Membrane comprising 86 wt % Poly(4-vinylpyridine) and 14 wt % Polyimide derived from Oxydianiline and Oxydiphthalic Anhydride (86P4VP) was synthesized by the same procedures as above except the appropriate amount of P4VP and a curing at 240° C. for 2.5 hours were used.

Figure 8:
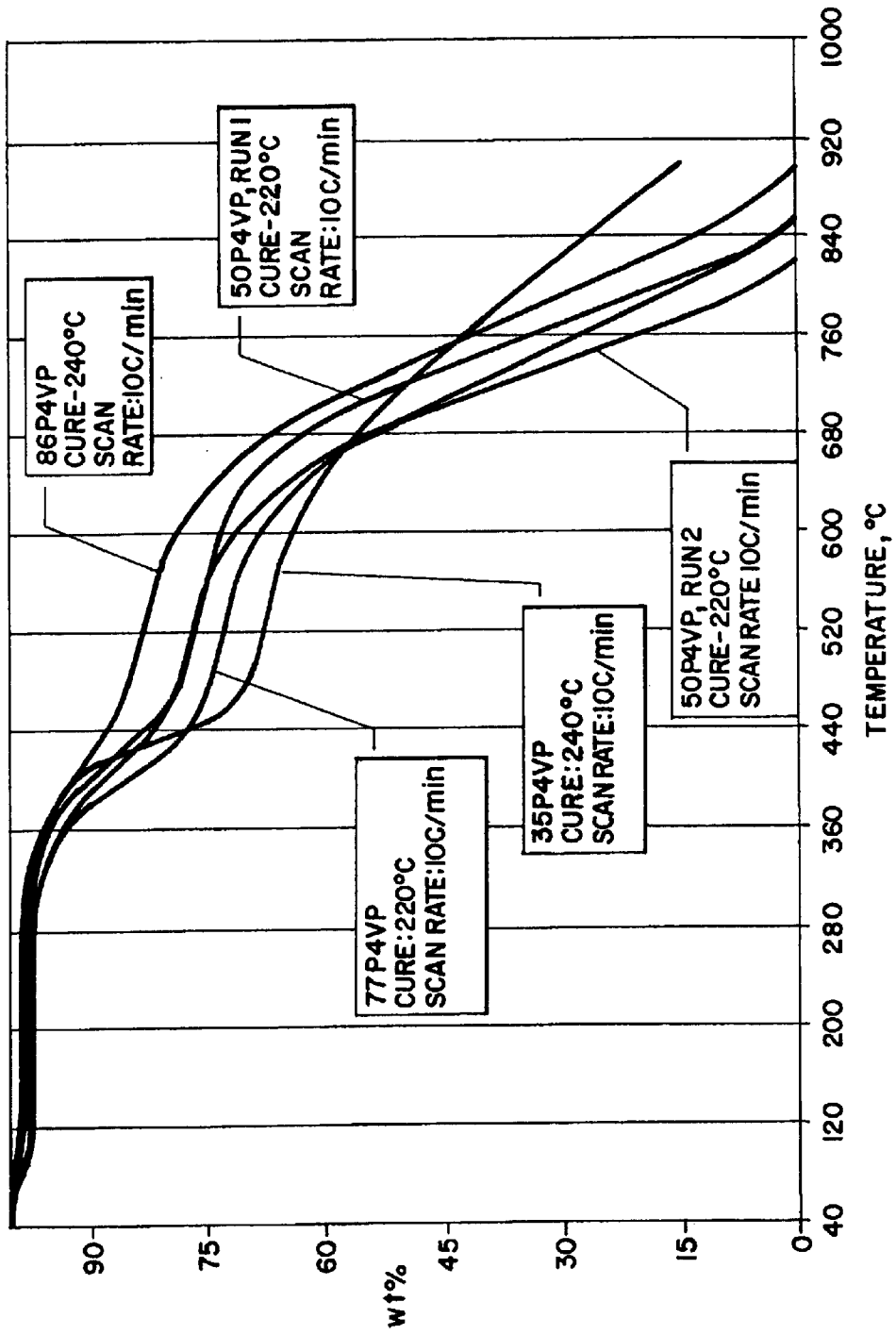
FIG. 8 is a chart illustrating thermal gravimetric analysis for polymer blends and copolymers for various membranes.

FIG. 8 shows that all the membranes thus synthesized have good thermal stability at up to 325° C. as measured by the use of thermal gravimetric analysis (TGA).

The following examples illustrate some of the dynamic sulfur tolerant processes and systems with inline acid gas removal for generating hydrogen for fuel cells and chemical processing equipment. These examples shall not be regarded as restricting the scope of the invention, as they are only examples of employing the inventive process and system.

EXAMPLE 1

A dynamic sulfur tolerant fuel process and system having 9" diameter and 16" long (ASMS is not included in the dimensions) was loaded with approximate 0.5 kg of AHR catalyst (FIG. 6). The temperature in the catalyst bed was kept at about 700 to 750° C., and the pressure was kept at about 2 psig. The flow rates for the feeds were: 1.3870 gmol per minute natural gas, 3.8308 gmol per minute air, and 1.9418 gmol per minute water. Table 1 presents the AHR products, which were cooled to about 350° C. before they were directed to the single stage WGS reactor packed with our improved sulfur tolerant non-pyrophoric WGS catalyst. The gas temperature was further declined to about 250° C. across the WGS reactor. Table 2 presents the WGS products where the concentration of CO was reduced to about 0.8 mol % (dry):

The acid gas ($H_2S$ and $CO_2$) selective removal was carried out in an ASMS. Table 3 presents the ASMS products at about 180 to 230° C. which were then fed to the PA fuel cells for generating about 6.15 kWe power.

TABLE 1

AHR PRODUCTS

| ATR Products | gmol/min | Vol %, wet | Vol %, dry | LHV Btu/hr | kWt | kWe* |
|---|---|---|---|---|---|---|
| $H_2S$ | $3.9960 \times 10^{-5}$ | 4.39 ppm | 5.28 ppm | | | |
| $H_2$ | 3.1146 | 34.22 | 41.37 | 42,810 | 12.54 | 5.02 |
| CO | 0.7703 | 8.46 | 10.23 | | | |
| $CO_2$ | 0.6038 | 6.63 | 8.02 | | | |
| $N_2$ | 3.0263 | 33.25 | 40.20 | | | |
| $CH_4$ | 0.0137 | 0.15 | 0.18 | | | |
| $H_2O$ | 1.5737 | 17.29 | — | | | |
| TOTAL | 9.1024 | 100.00 | 100.00 | | | |

Efficiency**$_{ATR}$ = 67.84%

TABLE 2

WGS PRODUCTS

| WGS Products | gmol/min | Vol %, wet | Vol %, dry | LHV Btu/hr | kWt | kWe* |
|---|---|---|---|---|---|---|
| $H_2S$ | $3.9960 \times 10^{-5}$ | 4.39 ppm | 5.28 ppm | | | |
| $H_2$ | 3.8199 | 41.96 | 46.39 | 52,504 | 15.38 | 6.15 |
| CO | 0.0651 | 0.72 | 0.79 | | | |

TABLE 2-continued

WGS PRODUCTS

| WGS Products | gmol/min | Vol %, wet | Vol %, dry | LHV Btu/hr | kWt | kWe* |
|---|---|---|---|---|---|---|
| $CO_2$ | 1.3090 | 14.38 | 15.90 | | | |
| $N_2$ | 3.0263 | 33.25 | 36.75 | | | |
| $CH_4$ | 0.0137 | 0.15 | 0.17 | | | |
| $H_2O$ | 0.8684 | 9.54 | — | | | |
| TOTAL | 9.1024 | 100.00 | 100.00 | | | |

Efficiency**$_{WGS}$ = 83.21%

TABLE 3

ASMS PRODUCTS

| ASMS Products | gmol/min | Vol %, wet | Vol %, dry | LHV Btu/hr | kWt | kWe* |
|---|---|---|---|---|---|---|
| $H_2S$ | $3.43 \times 10^{-7}$ | 44 ppb | 50 ppb | 51,858 | 15.19 | 6.08 |
| $H_2$ | 3.7729 | 48.81 | 54.99 | | | |
| CO | 0.0651 | 0.84 | 0.95 | | | |
| $CO_2$ | 0.0198 | 0.26 | 0.29 | | | |
| $N_2$ | 2.9891 | 38.67 | 43.57 | | | |
| $CH_4$ | 0.0137 | 0.18 | 0.20 | | | |
| $H_2O$ | 0.8684 | 11.24 | — | | | |
| TOTAL | 7.7290 | 100.00 | 100.00 | | | |

Efficiency**$_{ASMS}$ = 82.19%
*80% fuel utilization plus 50% fuel cell stack efficiency are used in the calculations for fuel cell electric power generation
**The energy efficiency (%) is defined as LHV of $H_2$ produced/LHV of fuel input × 100

EXAMPLE 2

Same as Example 1 except a methanator was added after the ASMS for the final CO and $CO_2$ contaminant reduction to appropriate levels (essentially total elimination). Table 4 presents the methanator products which were then cooled by the interchanger to about 80° C. before they were fed to the PEM or alkaline fuel cells for generating about 5.6 kWe power (FIG. 5).

TABLE 4

METHANATOR PRODUCTS

| ASMS Products | gmol/min | Vol %, wet | Vol %, dry | LHV Btu/hr | kWt | kWe* |
|---|---|---|---|---|---|---|
| $H_2S$ | $3.43 \times 10^{-7}$ | 45 ppb | 52 ppb | | | |
| $H_2$ | 3.4984 | 46.28 | 53.12 | 48,085 | 14.08 | 5.63 |
| CO | — | — | — | | | |
| $CO_2$ | — | — | — | | | |
| $N_2$ | 2.9891 | 39.54 | 45.38 | | | |
| $CH_4$ | 0.0986 | 1.31 | 1.50 | | | |
| $H_2O$ | 0.9731 | 12.87 | — | | | |
| TOTAL | 7.5592 | 100.00 | 100.00 | | | |

Efficiency**$_{METHANATOR}$ = 76.27%
*80% fuel utilization plus 50% fuel cell stack efficiency are used in the calculations for fuel cell electric power generation
**The energy efficiency (%) is defined as LHV of $H_2$ produced/LHV of fuel input × 100

EXAMPLE 3

Same as Example 2 except that an AWMR was used to replace both the ASMS and methanator for the final CO contaminant reduction to less than 10 ppm levels required by the PEM fuel cells. Table 5 presents the AWMR products which were then cooled by the interchanger to about 80° C. before they were fed to the PEM fuel cells for generating about 5.8 kWe power. Since trace amounts of $CO_2$ (256 ppm wet) still remains in the hydrogen rich gas produced by using the AWMR, a $CO_2$ removal step is needed before it can be fed to alkaline fuel cells.

TABLE 5

AWMR PRODUCTS

| ASMS Products | gmol/min | Vol %, wet | Vol %, dry | LHV Btu/hr | kWt | kWe* |
|---|---|---|---|---|---|---|
| $H_2S$ | $3.43 \times 10^{-7}$ | 46 ppb | 52 ppb | | | |
| $H_2$ | 3.5954 | 47.72 | 54.47 | 49,418 | 14.47 | 5.79 |
| CO | $5.6745 \times 10^{-5}$ | 7.5 ppm | 8.6 ppm | | | |
| $CO_2$ | $1.9267 \times 10^{-3}$ | 256 ppm | 292 ppm | | | |
| $N_2$ | 2.9891 | 39.68 | 45.29 | | | |
| $CH_4$ | 0.0137 | 0.18 | 0.21 | | | |
| $H_2O$ | 0.9335 | 12.39 | — | | | |
| TOTAL | 7.5336 | 100.00 | 100.00 | | | |

Efficiency**$_{AWMR}$ = 78.32%
*80% fuel utilization plus 50% fuel cell stack efficiency are used in the calculations for fuel cell electric power generation
**The energy efficiency (%) is defined as LHV of $H_2$ produced/LHV of fuel input × 100

While the invention has been described with reference to the preferred embodiments, it will be understood by those skilled in the art that various changes can be made and equivalents can be substituted for process steps, equipment, parts, elements, components, and materials thereof without departing from the scope of the invention. In addition, many modifications can be made to adapt a particular situation or material to the teachings of the invention without departing from the essential scope thereof. Therefore, it is intended that the invention not be limited to the particular embodiments disclosed as the best modes contemplated for carrying out this invention, but that the invention includes all embodiments and equivalents falling within the scope of the appended claims.

What is claimed is:

1. A dynamic sulfur tolerant process with inline acid gas-selective removal for converting sulfur bearing carbonaceous fuels into hydrogen or hydrogen rich gases suitable for use in fuel cells or chemical processing applications, comprising the following steps:

vaporizing liquid fuels and water and preheating one or more feeds in a vaporizer/preheater by transferring the sensible heat from reformate gas;

feeding fuel, water and oxidant over a sulfur tolerant catalyst in an AHR to yield a hydrogen rich reformate gas to combine the heat effects of the partial oxidation, steam reforming reactions, preheat and heat losses;

converting CO and steam in the reformate gas to additional hydrogen and $CO_2$ via a WGS reaction in a WGS reactor;

vaporizing and superheating water fed to a WGS boiler coil in a steam generator;

removing selectively substantial amounts of acid gas ($H_2S$ and $CO_2$) in WGS product gas in an ASMS;

further reducing CO and $CO_2$ concentration levels in a methanator;

interchanging heat between hydrogen rich gas and sweep gas in a heat interchanger; and wherein sulfur tolerant AHR and WGS catalysts are used to make a combined AHR/WGS reactor ahead of the ASMS to be sulfur tolerant.

2. A The process of claim 1 wherein no sulfur removal is required in the combined AHR/WGS reactor which makes the combined reactor to be maintenance free.

3. The process of claim 1 wherein the sulfur tolerant nature of the combined AHR/WGS reactor allows downstream inline acid gas-selective removal via an ASMS at much lower temperatures (about 180 to 250° C.), and thus increases the overall energy efficiency of the fuel process and system.

4. The process of claim 1 wherein the ASMS can reduce the $H_2S$ concentration in the WGS product gas to less than 500 ppb levels.

5. The process of claim 1 wherein the ASMS can reduce the $H_2S$ concentration in the WGS product gas to less than 250 ppb levels preferable to about 10 to 100 ppb levels.

6. The process of claim 1 wherein the ASMS product gas at about 180 to 230° C. containing about 0.5 to 2 mol % CO and less than 100 ppb $H_2S$ is an ideal feed for PA fuel cells.

7. The process of claim 1 wherein the ASMS is in a compact configuration and comprises a spiral-wound membrane module with a high membrane surface area per unit volume.

8. The process of claim 1 wherein the ASMS comprises hollow fibers.

9. The process of claim 1 wherein the ASMS comprises a spiral-wound membrane or hollow fibers to provide a faster response to load changes, higher energy efficiency and lower cost fuel process and system.

10. The process of claim 1 wherein the ASMS enhances the $H_2$ content in the hydrogen rich gas produced by acid gas-selective removal.

11. The process of claim 1 wherein the ASMS enables methanation reaction equilibrium to decrease the CO and $CO_2$ concentration in the hydrogen rich gas to appropriate levels suitable for feeding PEM and alkaline fuel cells.

12. The process of claim 1 wherein the acid gas-selective membrane in the ASMS comprises polyamine and polyimide blends and copolymers which have high acid gas/$H_2$ selectivity and good thermal stability at up to 325° C. as measured by TGA.

13. A dynamic sulfur tolerant process with inline acid gas-selective removal for converting sulfur bearing carbonaceous fuels into hydrogen or hydrogen rich gases suitable for use in fuel cells or chemical processing applications, comprising the following steps:

vaporizing liquid fuels and water and preheating one or more feeds in a vaporizer/preheater by transferring the sensible heat from reformate gas;

feeding fuel, water and oxidant over a sulfur tolerant catalyst in an AHR to yield a hydrogen rich reformate gas to combine the heat effects of the partial oxidation, steam reforming, reactions, preheat and heat losses;

converting CO and steam in the reformate gas to additional hydrogen and $CO_2$ via a WGS reaction in a WGS reactor;

vaporizing and superheating water fed to a WGS boiler coil in a steam generator;

removing selectively substantial amounts of acid gas ($H_2S$ and $CO_2$) in WGS product gas in an ASMS;

further reducing CO and $CO_2$ concentration levels in a methanator;

interchanging heat between hydrogen rich gas and sweep gas in a heat interchanger; and wherein the heat generated by the methanation reactions is used to heat the sweep gas in the heat interchanger.

14. The process of claim 13 wherein the methanator can totally eliminate both CO and $CO_2$ in the WGS product gas.

15. The process of claim 13 wherein the heat interchanger cools the hydrogen rich gas to a temperature of about 80° C. as required by PEM and alkaline fuel cells.

16. The process of claim 13 wherein the sweep gas is preheated in the heat interchanger by the methanator product gas before it enters the ASMS.

17. The process of claim 13, utilizing a single stage WGS reactor.

18. A dynamic sulfur tolerant process with inline acid gas-selective removal for converting sulfur bearing carbonaceous fuels into hydrogen or hydrogen rich gases suitable for use in fuel cells or chemical processing applications, comprising the following steps:

vaporizing liquid fuels and water and preheating one or more feeds in a vaporizer/preheater by transferring the sensible heat from reformate gas;

feeding fuel, water and oxidant over a sulfur tolerant catalyst in an AHR to yield a hydrogen rich reformate gas to combine the heat effects of the partial oxidation, steam reforming reactions, preheat and heat losses;

converting CO and steam in the reformate gas to additional hydrogen and $CO_2$ via a WGS reaction in a WGS reactor;

vaporizing and superheating water fed to a WGS boiler coil in a steam generator;

removing selectively substantial amounts of acid gas ($H_2S$ and $CO_2$) in WGS product gas in an ASMS;

further reducing CO and $CO_2$ concentration levels in a methanator;

interchanging heat between hydrogen rich gas and sweep was in a heat interchanger; and wherein heat generated by burning the unused hydrogen emanating from fuel cells is used to preheat one or more feeds or the sweep gas.

19. A dynamic sulfur tolerant process with inline acid gas-selective removal for converting sulfur bearing carbonaceous fuels into hydrogen or hydrogen rich gases suitable for use in fuel cells or chemical processing applications, comprising the following steps:

vaporizing liquid fuels and water and preheating one or more feeds in a vaporizer/preheater by transferring the sensible heat from reformate gas;

feeding fuel, water and oxidant over a sulfur tolerant catalyst in an AHR to yield a hydrogen rich reformate gas to combine the heat effects of the partial oxidation, steam reforming reactions, preheat and heat losses;

converting CO and steam in the reformate gas to additional hydrogen and $CO_2$ via a WGS reaction in a WGS reactor;

vaporizing and superheating water fed to a WGS boiler coil in a steam generator;

removing selectively substantial amounts of acid gas ($H_2S$ and $CO_2$) in WGS product gas in an ASMS;

further reducing CO and $CO_2$ concentration levels in a methanator;

interchanging heat between hydrogen rich gas and sweet gas in a heat interchanger; and wherein the ASMS and methanator comprises a unitary AWMR for both acid gas-selective removal and CO contaminant reduction to less than 10 ppm levels suitable for use in PEM fuel cells.

20. The process of claim 19 wherein the $CO_2$ in the AWMR product gas is removed before the product gas is fed to alkaline fuel cells.

21. The process of claim 19 wherein the AWMR contains an acid gas-selective removal section followed by a WGS reaction section.

22. The process of claim 19 wherein the AWMR is in a compact configuration comprising a spiral-wound membrane module with a high membrane surface area per unit volume.

23. The process of claim 19 wherein the AWMR contains a non-pyrophoric WGS catalyst between layers of a spiral-wound membrane in a WGS reaction section.

24. The process of claim 23 wherein the non-pyrophoric WGS catalyst comprises a sulfur intolerant catalyst or sulfur tolerant catalyst.

25. A dynamic sulfur tolerant process with inline acid gas-selective removal for converting sulfur bearing carbonaceous fuels into hydrogen or hydrogen rich gases suitable for use in fuel cells or chemical processing applications, comprising the following steps:

vaporizing liquid fuels and water and preheating one or more feeds in a vaporizer/preheater by transferring the sensible heat from reformate gas;

feeding fuel, water and oxidant over a sulfur tolerant catalyst in an AHR to yield a hydrogen rich reformate gas to combine the heat effects of the partial oxidation, steam reforming reactions, preheat and heat losses;

converting CO and steam in the reformate gas to additional hydrogen and $CO_2$ via a WGS reaction in a WGS reactor;

vaporizing and superheating water fed to a WGS boiler coil in a steam generator;

removing selectively substantial amounts of acid gas ($H_2S$ and $CO_2$) in WGS product gas in an ASMS;

further reducing CO and $CO_2$ concentration levels in a methanator;

interchanging heat between hydrogen rich gas and sweep gas in a heat interchanger; and wherein spent cathode gas sweep, air sweep or vacuum can be used to remove the permeate comprising the acid gas at the low pressure permeate side to maintain a high driving force for the separation.

26. A dynamic sulfur tolerant process in a system with inline acid gas-selective removal for converting sulfur bearing carbonaceous fuels into hydrogen or hydrogen rich gases suitable for use in fuel cells or chemical processing applications, comprising the following steps:

vaporizing liquid fuels and water and preheating one or more feeds in a vaporizer/preheater by transferring the sensible heat from reformate gas;

feeding fuel, water and oxidant over a sulfur tolerant catalyst in an AHR to yield a hydrogen rich reformate gas to combine the heat effects of the partial oxidation, steam reforming reactions, preheat and heat losses;

converting CO and steam in the reformate gas to additional hydrogen and $CO_2$ via a WGS reaction in a WGS reactor;

vaporizing and superheating water fed to a WGS boiler coil in a steam generator;

removing selectively substantial amounts of acid gas ($H_2S$ and $CO_2$) in WGS product gas in an ASMS;

further reducing CO and $CO_2$ concentration levels in a methanator;

interchanging heat between hydrogen rich gas and sweep gas in a heat interchanger; and wherein the operating pressure of the system is less than or equal to 10 atmospheres.

27. The process of claim 26 wherein the available fuels for the fuel process and system include hydrocarbons selected from the group consisting of gasoline, diesel, naphtha, natural gas, liquefied petroleum gas (LPG), heating oil, kerosene, jet fuel, alkanes, alkenes, aromatics, and hydrocarbon streams and alcohols selected from the group consisting of methanol, ethanol, butanol, pentanol, and alcohol-containing steams.

28. The process of claim 26 wherein the oxidant comprises air.

29. The process of claim 26 wherein the oxidant comprises enriched air or pure oxygen.

30. The process of claim 26 operated at various loads between 10% to 110% of design capacity.

31. A dynamic sulfur tolerant process in a system with inline acid gas-selective removal for converting sulfur bearing carbonaceous fuels into hydrogen or hydrogen rich gases suitable for use in fuel cells or chemical processing applications, comprising the following steps:

vaporizing liquid fuels and water and preheating one or more feeds in a vaporizer/preheater by transferring the sensible heat from reformate gas;

feeding fuel, water and oxidant over a sulfur tolerant catalyst in an AHR to yield a hydrogen rich reformate gas to combine the heat effects of the partial oxidation, steam reforming reactions, preheat and heat losses;

converting CO and steam in the reformate gas to additional hydrogen and $CO_2$ via a WGS reaction in a WGS reactor;

vaporizing and superheating water fed to a WGS boiler coil in a steam generator;

removing selectively substantial amounts of acid gas ($H_2S$ and $CO_2$) in WGS product gas in an ASMS;

further reducing CO and $CO_2$ concentration levels in a methanator;

interchanging heat between hydrogen rich gas and sweep gas in a heat interchanger; and wherein the pressure drop of the system is 5 psi or less.

32. A process for producing hydrogen or hydrogen rich gases from sulfur bearing carbonaceous fuels for use in fuels cells and chemical processing applications, comprising the steps of:

reforming sulfur bearing carbonaceous fuels to produce a reformate;

converting CO and water in the reformate gas to additional hydrogen and $CO_2$ via a WGS reaction;

upgrading the reformate by inline acid gas-selective removal to decrease concentration of $CO_2$ and $H_2S$ in the reformate and produce a retentate comprising hydrogen or hydrogen rich gases suitable for use in PA fuel cells; and wherein said inline acid gas-selective removal includes processing in an AWMR.

33. The process of claim 32 wherein said reforming occurs in the presence of a catalyst.

34. The process of claim 32 wherein said reforming comprises steam reforming.

35. The process of claim 32 wherein said reforming includes processing in an AHR or a partial oxidation reformer.

36. The process of claim 32 wherein said inline acid gas-selective removal includes processing in a methanator.

37. A process for producing hydrogen or hydrogen rich gases from sulfur bearing carbonaceous fuels for use in fuels cells and chemical processing applications, comprising the steps of:

reforming sulfur bearing carbonaceous fuels to produce a reformate;

converting CO and water in the reformate gas to additional hydrogen and $CO_2$ via a WGS reaction;

upgrading the reformate by inline acid gas-selective removal to decrease concentration of $CO_2$ and $H_2S$ in the reformate and produce a retentate comprising hydrogen or hydrogen rich gases suitable for use in PA fuel cells;

said reforming occurs in said AHR in the presence of an AHR catalyst, said AHR catalyst comprising a hydrodesulfurization portion; and wherein said hydrodesulfurization portion comprises at least one compound selected from the group consisting of: a Group IV rare earth metal sulfide, a Group IV rare earth metal sulfate, a substoichiometric metal thereof, and a mixture thereof.

38. The process of claim 37 wherein said AHR catalyst comprises a dehydrogenation portion of the AHR catalyst comprising at least one metallic compound selected from the group consisting of: a Group VIII transition metal and an alloy of a Group VIII transition metal.

39. The process of claim 37 wherein said AHR catalyst further comprises:

an oxidation portion comprising an oxidation material selected from the group consisting of a ceramic oxide, a dopant, and mixtures thereof;

said ceramic oxide comprising a ceramic oxide material selected from the group consisting of $ZrO_2$, $CeO_2$, $Bi_2O_3$, $BiVO_4$, $LaGdO_3$, gadolinium doped ceria, and mixtures thereof; and said dopant comprises a dopant material elected from the group consisting of a rare earth metal, an alkali metal, an alkaline earth metal, and mixtures thereof.

40. The process of claim 37 wherein said sulfur bearing carbonaceous fuels are selected from the group consisting of: gasoline, diesel fuel, methane-containing gas, natural gas, LPG, heating oil, kerosene, jet fuel, alkanes, alkenes, aromatics, alcohol, methanol, ethanol, butanol, proponol, corn products, biomass, a solution derived from any of the preceding, one or more fractions from petroleum processing, and one or more fractions from processing of chemicals.

41. The process of claim 37 including processing said reformate in an ASMS for use in PA fuel cells; an ASMS with methanator for use in PEM and alkaline fuel cells; or an AWMR for use in PEM fuel cells.

42. The process of claim 41 wherein said ASMS and AWMR comprises a spiral wound membrane.

43. The process of claim 41 wherein said ASMS and AWMR comprises a membrane comprises polyamine and polyimide blends and copolymers with the combination of polyamine for high acid gas/$H_2$ selectivity and polyimide for high thermal stability.

44. The process of claim 41 wherein said ASMS and AWMR comprises a membrane comprising poly(2 or 4 vinylpyridine) and polyimide derived from polyamic acid which is synthesized from oxydianiline and oxidiphtalic anhydride.

45. A system for producing hydrogen or hydrogen rich gases from sulfur bearing carbonaceous fuels for use in fuel cells and chemical processing applications, comprising:

a reformer for reforming sulfur bearing carbonaceous fuels to produce a reformate;

a WGS reactor for converting CO and steam in the reformate gas to additional hydrogen and $CO_2$;

an upgrade comprising an inline acid gas-selective remover for decreasing concentration of $CO_2$ and $H_2S$ in the reformate to produce a retentate comprising hydrogen or hydrogen rich gases suitable for use in PA fuel cells; and wherein said inline acid gas-selective remover comprises an ASMS.

46. The system of claim 45 wherein said reformer comprises a steam reformer.

47. The system of claim 45 wherein said upgrade includes a methanator.

48. The system of claim 45 wherein said upgrade includes a heat interchanger.

49. A system for producing hydrogen or hydrogen rich gases from sulfur bearing carbonaceous fuels for use in fuel cells and chemical processing applications, comprising:

a reformer for reforming sulfur bearing carbonaceous fuels to produce a reformate;

a WGS reactor for converting CO and steam in the reformate gas to additional hydrogen and $CO_2$;

an upgrade comprising an inline acid gas-selective remover for decreasing concentration of $CO_2$ and $H_2S$ in the reformate to produce a retentate comprising hydrogen or hydrogen rich gases suitable for use in PA fuel cells; and wherein said inline acid gas-selective remover includes an AWMR.

50. The system of claim 49 including a catalyst in said reformer.

51. A system for producing hydrogen or hydrogen rich gases from sulfur bearing carbonaceous fuels for use in fuel cells and chemical processing applications, comprising:

a reformer for reforming sulfur bearing carbonaceous fuels to produce a reformate;

a WGS reactor for converting CO and steam in the reformate gas to additional hydrogen and $CO_2$;

an upgrade comprising an inline acid gas-selective remover for decreasing concentration of $CO_2$ and $H_2S$ in the reformate to produce a retentate comprising hydrogen or hydrogen rich gases suitable for use in PA fuel cells;

an AHR catalyst in said AHR, said AHR catalyst comprising a hydrodesulfurization portion; and wherein said hydrodesulfurization portion comprises at least one compound selected from the group consisting of: a Group IV rare earth metal sulfide, a Group IV rare earth metal sulfate, a substoichiometric metal thereof, and a mixture thereof.

52. The system of claim 51 wherein said AHR catalyst comprises a dehydrogenation portion comprising at least one metallic compound selected from the group consisting of: a Group VIII transition metal and an alloy of Group VIII transition metal.

53. The system of claim 51 wherein said AHR catalyst comprises:

an oxidation portion comprising an oxidation material selected from the group consisting of a ceramic oxide, a dopant, and mixtures thereof;

said ceramic oxide comprising a ceramic oxide material selected from the group consisting of $ZrO_2$, $CeO_2$, $Bi_2O_3$, $BiVO_4$, $LaGdO_3$, gadolinium doped ceria, and mixtures thereof; and said dopant comprises a dopant material selected from the group consisting of a rare earth metal, an alkali metal, an alkaline earth metal, and mixtures thereof.

54. The system of claim 51 wherein said sulfur bearing carbonaceous fuels arc selected from the group consisting of: gasoline, diesel fuel, methane-containing gas, natural gas, LPG, heating oil, kerosene, jet fuel, alkanes, alkenes, aromatics, alcohol, methanol, ethanol, butanol, propanol, corn products, biomass, a solution derived from any of the preceding, one or more fractions from petroleum processing, and one or more fraction from processing of chemicals.

55. A system for producing hydrogen or hydrogen rich gases from sulfur bearing carbonaceous fuels for use in fuel cells and chemical processing applications, comprising:
- a reformer for reforming sulfur bearing carbonaceous fuels to produce a reformate;
- a WGS reactor for converting CO and steam in the reformate gas to additional hydrogen and $CO_2$;
- an upgrade comprising an inline acid gas-selective remover for decreasing concentration of $CO_2$ and $H_2S$ in the reformate to produce a retentate comprising hydrogen or hydrogen rich gases suitable for use in PA fuel cells; and
- wherein said inline acid gas-selective remover is selected from the group consisting of: an ASMS for processing said reformate for use in PA fuel cells; an ASMS with a methanator for processing said reformate for use in PEM and alkaline fuel cells; and an AWMR for processing said reformate for use in PEM fuel cells.

56. The system of claim 55 wherein said ASMS and AWMR comprises a spiral wound membrane.

57. The system of claim 55 wherein said ASMS and AWMR comprises a membrane comprising a material selected from a group of: a polyamine, a polyamine blend, a polyamide copolymer, and mixtures thereof.

58. The system of claim 55 wherein said ASMS and AWMR comprises a membrane comprising poly(2 or 4 vinylpyridine) and polyimide derived from polyamic acid which is synthesized from oxydianiline and oxidiphtalic anhydride.

59. A dynamic sulfur tolerant system for producing hydrogen or hydrogen rich gases from sulfur bearing carbonaceous fuels for use in fuel cells and chemical processing applications, comprising:
- an AHR for reforming sulfur bearing carbonaceous fuels to produce a reformate;
- a WGS reactor for converting CO and water in the reformate to additional hydrogen and $CO_2$;
- an upgrade comprising an inline acid gas-selective remover for decreasing concentration of $CO_2$ and $H_2S$ in the reformate to produce a retentate comprising hydrogen or hydrogen rich gases for use in fuel cells and chemical processing applications; and
- wherein said inline acid gas-selective remover comprises an ASMS.

60. The system of claim 59 including a preheater for preheating one or more feeds.

61. The system of claim 59 including a vaporizer for vaporizing liquid fuels and water.

62. The system of claim 59 including a WGS reactor for converting CO and water in the reformate to additional hydrogen and $CO_2$.

63. The system of claim 59 including a steam generator comprising a WGS boiler coil for vaporizing and superheating water fed to said WGS reactor.

64. The system of claim 59 wherein said upgrade includes a heater interchanger.

65. The system of claim 59 wherein said ASMS comprises a spiral wound membrane module.

66. The system of claim 59 wherein said ASMS comprises hollow fibers.

67. The system of claim 59 wherein said ASMS comprises a membrane comprising polyamine and polyimide blends and copolymers with the combination of polyamine for high acid gas/$H_2$ selectivity and polyimide for high thermal stability.

68. The system of claim 59 wherein said upgrade includes a methanator.

69. A dynamic sulfur tolerant system for producing hydrogen or hydrogen rich gases from sulfur bearing carbonaceous fuels for use in fuel cells and chemical processing applications, comprising:
- an AHR for reforming sulfur bearing carbonaceous fuels to produce a reformate;
- a WGS reactor for converting CO and water in the reformate to additional hydrogen and $CO_2$;
- an upgrade comprising an inline acid gas-selective remover for decreasing concentration of $CO_2$ and $H_2S$ in the reformate to produce a retentate comprising hydrogen or hydrogen rich gases for use in fuel cells and chemical processing applications; and
- wherein said inline acid gas-selective remover includes an AWMR.

70. The system of claim 69 wherein said AWMR comprises an acid gas-selective removal section and a WGS reaction section.

71. The system of claim 69 wherein said AWMR comprises a spiral wound membrane module.

72. The system of claim 69 wherein said AWMR contains a non-pyrophoric WGS catalyst.

73. The system of claim 72 wherein said catalyst comprises a sulfur intolerant catalyst.

74. A dynamic sulfur tolerant system for producing hydrogen or hydrogen rich gases from sulfur bearing carbonaceous fuels for use in fuel cells and chemical processing applications, comprising:
- an AHR for reforming sulfur bearing carbonaceous fuels to produce a reformate;
- a WGS reactor for converting CO and water in the reformate to additional hydrogen and $CO_2$;
- an upgrade comprising an inline acid gas-selective remover for decreasing concentration of $CO_2$ and $H_2S$ in the reformate to produce a retentate comprising hydrogen or hydrogen rich gases for use in fuel cells and chemical processing applications;
- an AHR catalyst in said AHR, said AHR catalyst comprising a hydrodesulfurization portion; and
- wherein said hydrodesulfurization portion of the AHR catalyst comprises at least one compound selected from the group consisting of: a Group IV rare earth metal sulfide, a Group IV rare earth metal sulfate, a substoichiometric metal thereof, and a mixture thereof.

75. The system of claim 74 wherein said hydrodesulfurization portion comprises at least one compound selected from the group consisting of: a Group IV rare earth metal sulfide, a Group IV rare earth metal sulfate, a substoichiometric metal thereof, and a mixture thereof.

76. The system of claim 74 wherein said AHR catalyst comprises a dehydrogenation portion comprising at least one metallic compound selected from the group consisting of: a Group VIII transition metal and an alloy of Group VIII transition metal.

77. The system of claim 74 wherein said AHR catalyst further comprises:
- an oxidation portion comprising an oxidation material selected from the group consisting of a ceramic oxide, a dopant, and mixtures thereof;
- said ceramic oxide comprising a ceramic oxide material selected from the group consisting of $ZrO_2$, $CeO_2$, $Bi_2O_3$, $BiVO_4$, $LaGdO_3$, gadolinium doped ceria, and mixtures thereof; and
- said dopant comprises a dopant material selected from the group consisting of a rare earth metal, an alkali metal, an alkaline earth metal, and mixtures thereof.

* * * * *